United States Patent
Dai et al.

(10) Patent No.: US 12,296,300 B2
(45) Date of Patent: May 13, 2025

(54) HIGH PERMEANCE NANOFILTRATION MEMBRANE WITH NANORING-LIKE STRUCTURE AND PREPARATION METHOD THEREOF

(71) Applicant: TONGJI UNIVERSITY, Shanghai (CN)

(72) Inventors: Ruobin Dai, Shanghai (CN); Zhiwei Wang, Shanghai (CN); Tianlin Wang, Shanghai (CN); Huimin Zhou, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 86 days.

(21) Appl. No.: 17/854,143

(22) Filed: Jun. 30, 2022

(65) Prior Publication Data

US 2023/0233996 A1    Jul. 27, 2023

(30) Foreign Application Priority Data

Jan. 26, 2022   (CN) .......................... 202210090623.7

(51) Int. Cl.
  *B01D 61/02*  (2006.01)
  *B01D 67/00*  (2006.01)
  (Continued)

(52) U.S. Cl.
  CPC ....... *B01D 61/027* (2013.01); *B01D 67/0095* (2013.01); *B01D 69/1251* (2022.08);
  (Continued)

(58) Field of Classification Search
  None
  See application file for complete search history.

(56) References Cited

U.S. PATENT DOCUMENTS

2009/0226496 A1*  9/2009  Mulqueen .............. A01N 43/88
                                                      514/357
2019/0282967 A1*  9/2019  Zhang .................... B01D 71/56

OTHER PUBLICATIONS

Simin Yang, et al., Interfacial polymerized polyamide nanofiltration membrane by demulsification of hexane-in-water droplets through hydrophobic PTFE membrane: Membrane performance and formation mechanism, Separation and Purification Technology, vol. 275, 2021 (Year: 2021).*

(Continued)

*Primary Examiner* — Jason M Greene
*Assistant Examiner* — Eric J McCullough
(74) *Attorney, Agent, or Firm* — troutman pepper locke; Tim Tingkang Xia, Esq.

(57) ABSTRACT

Provided is a high permeance nanofiltration membrane with nanoring-like structure and preparation method thereof. The membrane includes a base film and a polyamide layer having nanoring-like structure morphology on its surface. The method includes: (1) formulating a piperazine nanoemulsion containing a surfactant, vegetable oil, piperazine and water; and (2) infiltrating a base film with the piperazine nanoemulsion, and removing excess droplets from the surface of the base film to obtain a treated base film; covering the surface of the treated base film with a solution of trimesoyl chloride in n-hexane to perform interfacial polymerization; and drying the resulting membrane. Introduction of nano-oil droplets into aqueous phase as templates to construct nanoring-like structure morphology on the surface of the polyamide layer significantly increases the specific surface area and free volume of the polyamide layer without losing the salt rejection rate of the membrane, thereby greatly improving its water permeance.

10 Claims, 2 Drawing Sheets

(51) Int. Cl.
   *B01D 69/12*   (2006.01)
   *B01D 71/34*   (2006.01)
   *B01D 71/56*   (2006.01)
   *B01D 71/68*   (2006.01)
(52) U.S. Cl.
   CPC ............. *B01D 71/34* (2013.01); *B01D 71/56* (2013.01); *B01D 71/68* (2013.01); *B01D 2323/216* (2022.08); *B01D 2323/46* (2013.01)

(56) References Cited

OTHER PUBLICATIONS

Yuanzhe Liang, et al., Polyamide Nanofiltration Membranes from Emulsion-Mediated Interfacial Polymerization, ACS ES&T Engineering 2021 1 (3), 533-542 (Year: 2021).*

* cited by examiner

HIGH PERMEANCE NANOFILTRATION MEMBRANE WITH NANORING-LIKE STRUCTURE AND PREPARATION METHOD THEREOF

CROSS-REFERENCE TO RELATED PATENT APPLICATION

This non-provisional application claims priority to and the benefit of, pursuant to 35 U.S.C. § 119(a), patent application Serial No. CN202210090623.7 filed in China on Jan. 26, 2022. The disclosure of the above application is incorporated herein in its entirety by reference.

FIELD

The present disclosure relates to the technical field of nanofiltration membranes, in particular to a high permeance nanofiltration membrane with a nanoring-like structure and a preparation method thereof.

BACKGROUND

Nanofiltration membrane separation has nano-scale screening ability and controllable selectivity, and is an important technology to achieve water pollution control and water resource regeneration. Nanofiltration membrane separation shows great application potential in the fields of advanced wastewater treatment, drinking water treatment, seawater desalination pretreatment, and zero discharge of industrial wastewater. The preparation method of a traditional nanofiltration membrane is mainly achieved by the interfacial polymerization of two immiscible phases on a porous polymeric substrate, with two phases typically being piperazine/water (aqueous phase) and trimesoyl chloride/n-hexane (oil phase), thereby forming a polyamide separation layer with nodular morphology. However, the polyamide separation layer with nodular morphology has a small specific surface area and the free volume between the polyamide layer and the porous substrate is limited, which restricts the water permeance of the overall nanofiltration membrane. The water permeance of nanofiltration membranes is directly related to the energy consumption of the system, and the preparation of nanofiltration membranes with high water permeance can effectively reduce the energy consumption of the system. Although the methods such as addition of nanomaterials adopted in the literature can improve the water permeance of nanofiltration membranes, this method has high cost, complex steps, and relatively large difficulty in engineering scale-up application.

SUMMARY

In view of the above problems existing in the prior art, the present disclosure provides a high permeance nanofiltration membrane with a nanoring-like structure and a preparation method thereof. Replacement of a aqueous phase solution with a nano-emulsion system, introduction of nano-oil droplets into the aqueous phase as templates, and constructing nanoring-like structure morphology on the surface of the polyamide layer significantly increase the specific surface area and free volume of the polyamide layer without compromising the salt rejection rate of the nanofiltration membrane, thereby greatly improving the water permeance of the nanofiltration membrane, such that the method has low cost and is easy to scale up for engineering.

The technical solutions of the present disclosure are as follows:

A high permeance nanofiltration membrane with a nanoring-like structure, wherein the high permeance nanofiltration membrane is composed of a base film and a polyamide layer having nanoring-like structure morphology on its surface.

Preferably, nanorings in the nanoring-like structure have an average diameter of 200-2000 nm and an average height of 50-200 nm.

Preferably, the base film is selected from the group consisting of a polyethersulfone base film, a polysulfone base film, and a polyvinylidene fluoride base film.

As a general inventive concept, the present disclosure provides a preparation method of a high permeance nanofiltration membrane with a nanoring-like structure, comprising the steps of:

(1) formulating a piperazine nanoemulsion containing a surfactant, vegetable oil, piperazine and water; and
(2) infiltrating a base film with the piperazine nanoemulsion, and removing excess droplets from the surface of the base film to obtain a treated base film; then covering the surface of the treated base film with a solution of trimesoyl chloride in n-hexane to perform interfacial polymerization; and drying the resulting membrane.

In the above preparation method, the base film is infiltrated with the piperazine nanoemulsion, so that nano-oil droplet templates and piperazine active monomers can be introduced on the surface of the base film. Covering the surface of the treated base film with the solution of trimesoyl chloride in n-hexane allows nanoemulsion template interfacial polymerization to occur, thereby forming a polyamide layer with a nanoring-like structure.

Preferably, in step (1), in the piperazine nanoemulsion, the mass volume ratio of the surfactant to water is 100-1000 mg: 1 L, the mass volume ratio of the vegetable oil to water is 100-4000 mg: 1 L, and the mass volume ratio of the piperazine to water is 1-30 g: 1 L.

Further preferably, the mass volume ratio of the vegetable oil to water is 1200 mg: 1 L. At this mass volume ratio, the density of the nanoring-like structure on the surface of the polyamide layer of the nanofiltration membrane is higher, and the diameter of the nanoring-like structure is smaller, resulting in a higher overall specific surface area.

Preferably, the piperazine nanoemulsion is prepared by: adding the surfactant, the vegetable oil and the piperazine to deionized water, stirring at a rotational speed of 15-30 rpm for 5-20 min, and performing ultrasonication in an ice bath for 5-20 min at an ultrasonic intensity of 300-1000 W, with a pause for 1-10 s every 5-20 s of the ultrasonication. Through the above method, a uniformly dispersed nanoemulsion suitable for constructing nanoring-like morphology on the surface of the polyamide layer can be obtained relatively quickly.

Preferably, in step (2), the mass volume fraction of trimesoyl chloride in the solution of trimesoyl chloride in n-hexane is 0.1-0.3 wt/v %.

Preferably, in step (2), the infiltrating specifically includes immersing the base film in the piperazine nanoemulsion and standing for 1-5 min; and covering the surface of the treated base film with the solution of trimesoyl chloride in n-hexane is performed for 30-90 s. By controlling each time parameter, the polyamide crosslinking can be further promoted and the nanofiltration membrane structure can be stabilized.

Preferably, in step (1), the surfactant is at least one selected from the group consisting of sodium dodecylbenzene sulfonate, sodium dodecyl sulfate, cetyltrimethylammonium bromide and Tween-80;

The vegetable oil is at least one selected from the group consisting of sunflower seed oil, peanut oil, olive oil, rapeseed oil, corn oil, sesame oil, and soybean oil.

Preferably, in step (2), the removing of the excess droplets from the surface of the base film is performed by use of a roller; and the drying is performed at a temperature of 55-65° C. for a duration of 1-10 min.

The beneficial technical effects of the present disclosure are as follows.

(1) the high permeance nanofiltration membrane with a nanoring-like structure prepared by using the nanoemulsion as the aqueous phase in the present disclosure has a larger specific surface area and free volume compared to nanofiltration membranes with a traditional nodular structure, and can effectively enhance the water permeance of the nanofiltration membrane without losing the salt rejection rate, thereby reducing the required operating pressure (assuming the effective membrane area remains unchanged) and energy consumption during advanced wastewater treatment.

(2) the nanoemulsion of the present disclosure is easy to formulate without synthesizing additional nanomaterials, only uses common vegetable oil as a nanotemplate, and thus is convenient and easy to obtain, such that the preparation process of the nanoemulsion is environmentally friendly.

(3) the present disclosure only needs to replace the traditional piperazine/water with the piperazine nanoemulsion in the process of scaling up the application of membrane-making formulation of the high permeance nanofiltration membrane with a nanoring-like morphology, without changing the overall membrane-making process, and is easy to realize industrialization of the new membrane-making formulation.

DETAILED DESCRIPTION

The present disclosure will be described in detail below in conjunction with the accompanying drawings and examples. Obviously, the described examples are only some, but not all, embodiments of the present disclosure. Based on the examples in the present disclosure, all other embodiments obtained by those of ordinary skill in the art without creative efforts shall fall within the protection scope of the present disclosure.

Example 1

The preparation method of a high permeance nanofiltration membrane with a nanoring-like structure comprises the following steps.

(1) 400 mg of sodium dodecyl sulfate, 800 mg of sunflower seed oil, and 2 g of piperazine were added to 1 L of deionized water, and the resultant was stirred at a stirring speed of 20 rpm for 5 min. The resultant was then subjected to ultrasonication with a cell disruptor probe in an ice bath at an ultrasonic intensity of 700 W, with a pause for 5 s every 10 s of the ultrasonication, for a total of 10 min to obtain a piperazine nanoemulsion.

(2) A polyethersulfone base film was immersed in the piperazine nanoemulsion and left to stand for 2 min, and the excess droplets were removed from the surface of the base film by use of a roller to obtain a treated polyethersulfone base film. Then, a solution of trimesoyl chloride in n-hexane with a mass volume fraction of 0.16 wt/v % was poured onto the surface of the treated polyethersulfone base film, so as to cover the surface of the treated polyethersulfone base film for 30 s to perform the interfacial polymerization. After removing the solution on the base film, the obtained membrane was treated in an oven at 60° C. for 5 min to obtain a high permeance nanofiltration membrane with a nanoring-like structure.

Figure 1:
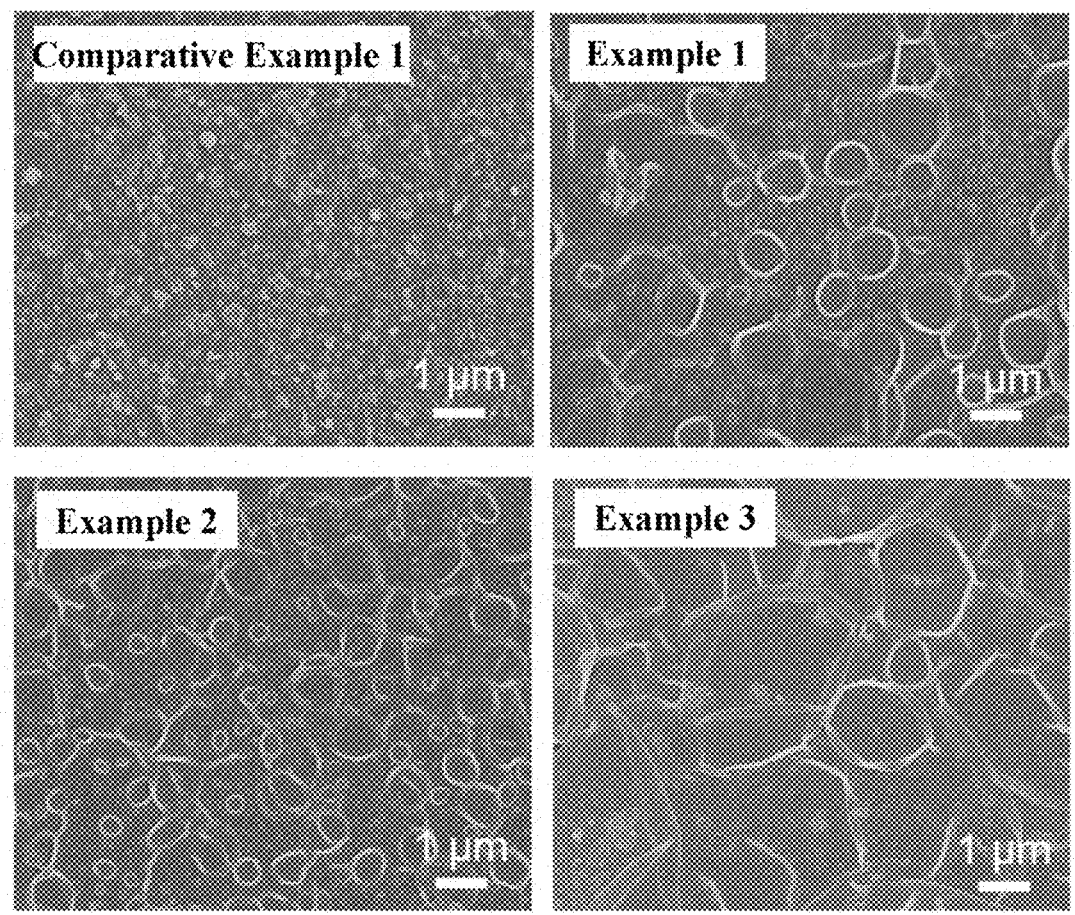
FIG. 1 is a scanning electron microscope image of the surface of the polyamide layer of four nanofiltration membranes prepared in Examples 1-3 and Comparative Example 1.

The high permeance nanofiltration membrane with a nanoring-like structure prepared by the above method is composed of a polyethersulfone base film and a polyamide layer. It can be seen from the scanning electron microscope image shown in FIG. 1 that the surface of the polyamide layer of the nanofiltration membrane in Example 1 has nanoring-like structure morphology. Nanorings in the nanoring-like structure have an average diameter of about 800 nm and an average height of about 100 nm.

Example 2

The preparation method of a high permeance nanofiltration membrane with a nanoring-like structure comprises the following steps.

(1) 400 mg of sodium dodecyl sulfate, 1200 mg of sunflower seed oil, and 2 g of piperazine were added to 1 L of deionized water, and the resultant was stirred at a stirring speed of 20 rpm for 5 min. The resultant was then subjected to ultrasonication with a cell disruptor probe in an ice bath at an ultrasonic intensity of 700 W, with a pause for 5 s every 10 s of the ultrasonication, for a total of 10 min to obtain a piperazine nanoemulsion.

(2) A polyethersulfone base film was immersed in the piperazine nanoemulsion and left to stand for 2 min, and the excess droplets were removed from the surface of the base film by use of a roller to obtain a treated polyethersulfone base film. Then, a solution of trimesoyl chloride in n-hexane with a mass volume fraction of 0.16 wt/v % was poured onto the surface of the treated polyethersulfone base film, so as to cover the surface of the treated polyethersulfone base film for 30 s to perform the interfacial polymerization. After removing the solution on the base film, the obtained membrane was treated in an oven at 60° C. for 5 min to obtain a high permeance nanofiltration membrane with a nanoring-like structure.

The high permeance nanofiltration membrane with a nanoring-like structure prepared by the above method is composed of a polyethersulfone base film and a polyamide layer. It can be seen from the scanning electron microscope image shown in FIG. 1 that the surface of the polyamide layer of the nanofiltration membrane in Example 2 has nanoring-like structure morphology, and the density of the nanoring-like structure is higher than that of the surface of the polyamide layer of the nanofiltration membrane in Example 1. Nanorings in the nanoring-like structure have an average diameter of about 400 nm and an average height of about 100 nm.

Example 3

The preparation method of a high permeance nanofiltration membrane with a nanoring-like structure comprises the following steps.

(1) 400 mg of sodium dodecyl sulfate, 1600 mg of sunflower seed oil, and 2 g of piperazine were added to 1 L of deionized water, and the resultant was stirred at a stirring speed of 20 rpm for 5 min. The resultant was then subjected to ultrasonication with a cell disruptor probe in an ice bath at an ultrasonic intensity of 700 W, with a pause for 5 s every 10 s of the ultrasonication, for a total of 10 min to obtain a piperazine nanoemulsion.

(2) A polyethersulfone base film was immersed in the piperazine nanoemulsion and left to stand for 2 min, and the excess droplets were removed from the surface of the base film by use of a roller to obtain a treated polyethersulfone base film. Then, a solution of trimesoyl chloride in n-hexane with a mass volume fraction of 0.16 wt/v % was poured onto the surface of the treated polyethersulfone base film, so as to cover the surface of the treated polyethersulfone base film for 30 s to perform the interfacial polymerization. After removing the solution on the base film, the obtained membrane was treated in an oven at 60° C. for 5 min to obtain a high permeance nanofiltration membrane with a nanoring-like structure.

The high permeance nanofiltration membrane with a nanoring-like structure prepared by the above method is composed of a polyethersulfone base film and a polyamide layer. It can be seen from the scanning electron microscope image shown in FIG. 1 that the surface of the polyamide layer of the nanofiltration membrane in Example 3 has nanoring-like structure morphology. Nanorings in the nanoring-like structure have an average diameter of about 1500 nm and an average height of about 75 nm. The average diameter of the nanoring-like structure is more than twice that of Example 2, which may be due to the agglomeration between nano-oil droplets after increasing the concentration of the nanoemulsion, resulting in an increase in the diameter of the nano-oil droplet template and thus a larger diameter of the formed nanoring-like structure, and the degree of increase in specific surface area is lower than that of Example 2.

Comparative Example 1

The preparation method of a nanofiltration membrane comprises the following steps.

A polyethersulfone base film was immersed in a piperazine/water solution with a mass volume fraction of 0.2 wt/v % for 2 min, and the excess droplets were removed from the surface of the polyethersulfone base film by use of a roller. Then, a solution of trimesoyl chloride in n-hexane with a mass volume fraction of 0.16 wt/v % was used to treat the surface of the base film for 30 s, and after removing the solution on the base film, the obtained membrane was treated in an oven at 60° C. for 5 min to obtain a nanofiltration membrane.

The nanofiltration membrane prepared by the above method is composed of a polyethersulfone base film and a polyamide layer. It can be seen from the scanning electron microscope image shown in FIG. 1 that the surface of the polyamide layer of the nanofiltration membrane in Comparative Example 1 has nodular morphology.

Performance Testing:

The nanofiltration membranes of Comparative Example 1 and Examples 1-3 were tested for their water permeance and $Na_2SO_4$ rejection rate with the following method.

Water permeance: each membrane sample was pre-pressed with pure water at an operating pressure of 5 bar for 1 h, and the test was conducted under cross-flow filtration conditions of an operating pressure of 5 bar, a water temperature of 25° C., and a cross-flow rate of 20 cm/s. Each sample membrane was removed from the water to measure its volume at the same period, and the water permeance was calculated. The test results are shown in FIG. 2.

$Na_2SO_4$ rejection rate: each membrane sample was pre-pressed with pure water at an operating pressure of 5 bar for 1 h, and a 1000 mg/L $Na_2SO_4$ aqueous solution was prepared. The test was conducted under cross-flow filtration conditions of an operating pressure of 5 bar, a water temperature of 25° C., and a cross-flow rate of 20 cm/s. The $Na_2SO_4$ concentration in the influent and effluent water was determined based on the conductivity, and the $Na_2SO_4$ rejection rate was calculated. The test results are shown in FIG. 2.

Figure 2:
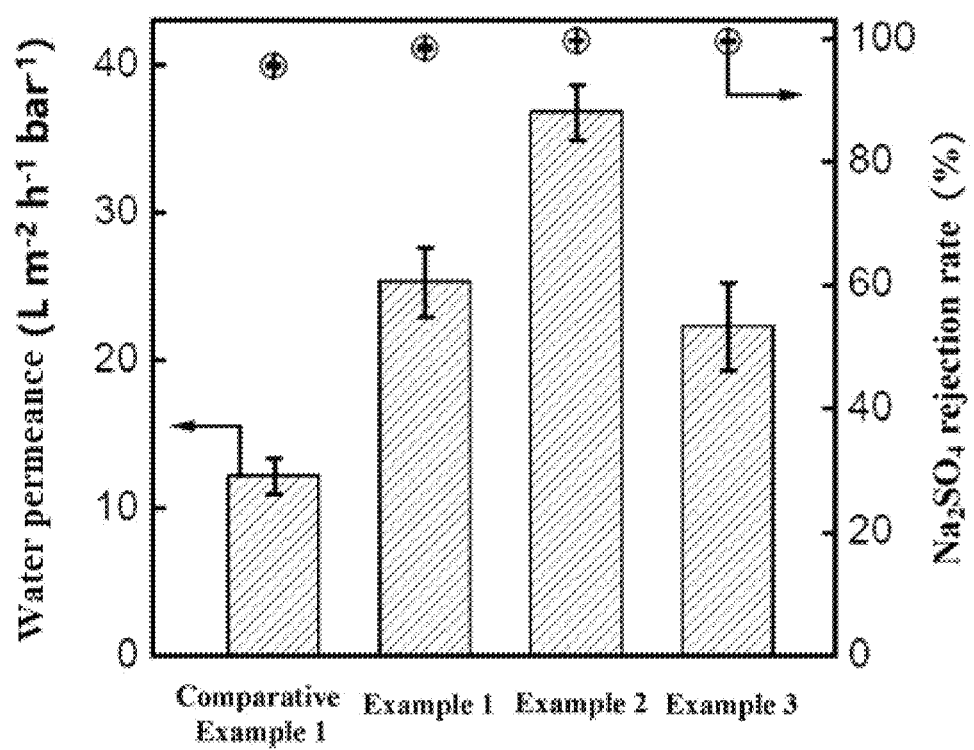
FIG. 2 is a comparison diagram of the water permeance and sodium sulfate rejection rate of four nanofiltration membranes prepared in Examples 1-3 and Comparative Example 1.

It can be seen from FIG. 2 that the water permeance of the nanofiltration membrane of Comparative Example 1 is 12.1 $L\ m^{-2}\ h^{-1}\ bar^{-1}$, and the water permeance of the nanofiltration membranes in Examples 1-3 is significantly improved compared to that of the nanofiltration membrane of Comparative Example 1, indicating that the nanoring-like morphology constructed by the nanoemulsion template has better water penetration performance than the nodular morphology. Among them, the water permeance of Example 2 is the highest, reaching 36.8 $L\ m^{-2}\ h^{-1}\ bar^{-1}$, which is more than 3 times that of Comparative Example 1, indicating that the denser the nanoring-like structure, the better its effect on improving the water permeance of the nanofiltration membrane. At the same time, FIG. 2 also shows that the nanofiltration membranes in Examples 1-3 have increased $Na_2SO_4$ rejection rate compared to the nanofiltration membrane in Comparative Example 1 (95.6% for Comparative Example 1, 98.4% for Example 1, 99.6% for Example 2, and 99.5% for Example 3), indicating that the use of nanoemulsion templates to construct the high permeance nanofiltration membrane with a nanoring-like structure does not loss salt rejection rate.

Although the embodiment of the present disclosure has been disclosed as above, it is not limited to the application listed in the description and the embodiment, and it can be applied to various fields suitable for the present disclosure. For those familiar with the art and those of ordinary skill in the art, various changes, modifications, substitutions and alterations can be made to these embodiments without departing from the principle and spirit of the present disclosure, and therefore the present disclosure is not limited to the specific details without departing from the general concepts defined by the claims and equivalents thereof.

What is claimed is:

1. A preparation method of a nanofiltration membrane with a nanoring-like structure, comprising the steps of:
   (1) formulating a piperazine nanoemulsion containing a surfactant, sunflower seed oil, piperazine and water, wherein the piperazine nanoemulsion has a mass volume ratio of the surfactant to water of 400 mg: 1 L, a mass volume ratio of the sunflower seed oil to water of 1200 mg: 1 L, and a mass volume ratio of the piperazine to water of 2 g: 1 L; and
   (2) infiltrating a base film with the piperazine nanoemulsion, and removing excess droplets from the surface of the base film to obtain a treated base film; then covering the surface of the treated base film with a solution of trimesoyl chloride in n-hexane to perform interfacial polymerization; and drying the resulting membrane to obtain the nanofiltration membrane, wherein the nanofiltration membrane is composed of the base film and a polyamide layer having nanoring-like structure morphology on the surface of the polyamide layer.

2. The preparation method according to claim 1, wherein in step (1), the piperazine nanoemulsion is prepared by: adding the surfactant, the sunflower seed oil and the piperazine to the water, stirring at a rotational speed of 15-30 rpm for 5-20 min, and performing ultrasonication in an ice bath for 5-20 min at an ultrasonic intensity of 300-1000 W, with a pause for 1-10 s every 5-20 s of the ultrasonication.

3. The preparation method according to claim 1, wherein in step (2), trimesoyl chloride is present in the solution of trimesoyl chloride in n-hexane in a mass volume fraction of 0.1-0.3 wt/v %.

4. The preparation method according to claim 1, wherein in step (2), the infiltrating includes immersing the base film in the piperazine nanoemulsion and standing for 1-5 min; and the covering of the surface of the treated base film with the solution of trimesoyl chloride in n-hexane is performed for 30-90 s.

5. The preparation method according to claim 1, wherein in step (1), the surfactant is at least one selected from the group consisting of sodium dodecylbenzene sulfonate, sodium dodecyl sulfate, cetyltrimethylammonium bromide and Tween-80; and
in step (2), the removing of the excess droplets from the surface of the base film is performed by use of a roller; and the drying is performed at a temperature of 55-65° C. for a duration of 1-10 min.

6. The preparation method according to claim 1, wherein nanorings in the nanoring-like structure have an average diameter of 200-2000 nm and an average height of 50-200 nm.

7. The preparation method according to claim 1, wherein the base film is selected from the group consisting of a polyethersulfone base film, a polysulfone base film, and a polyvinylidene fluoride base film.

8. A nanofiltration membrane with a nanoring-like structure prepared by the preparation method according to claim 1,
wherein at a water temperature of 25° C., the nanofiltration membrane has a water permeance being 36.8 L $m_{-2}$ $h^{-1}$ $bar^{-1}$, and a $Na_2SO_4$ rejection rate being 99.6%.

9. The nanofiltration membrane with a nanoring-like structure according to claim 8, wherein nanorings in the nanoring-like structure have an average diameter of 200-2000 nm and an average height of 50-200 nm.

10. The nanofiltration membrane with a nanoring-like structure according to claim 8, wherein the base film is selected from the group consisting of a polyethersulfone base film, a polysulfone base film, and a polyvinylidene fluoride base film.

* * * * *